Nov. 26, 1968 R. HAINZ 3,412,579
COUPLING MEANS FOR A TEST STAND FOR FUEL INJECTION PUMPS
Filed Aug. 30, 1966

United States Patent Office 3,412,579
Patented Nov. 26, 1968

3,412,579
COUPLING MEANS FOR A TEST STAND FOR
FUEL INJECTION PUMPS
Richard Hainz, Salzburg, Austria, assignor to Friedmann
& Maier, Hallein, Salzburg, Austria
Filed Aug. 30, 1966, Ser. No. 575,991
Claims priority, application Austria, Sept. 1, 1965,
A 8,028/65
6 Claims. (Cl. 64—6)

ABSTRACT OF THE DISCLOSURE

Coupling means for a test stand for fuel injection pumps for coupling a drive shaft protruding from a drive spindle housing of the test stand with engaging dogs of the pump to be tested in which the drive shaft is surrounded by a sleeve. One end of the sleeve is slotted to define two sleeve halves carrying coupling claws cooperable with the engaging dogs of the pump to be tested with the other end of the sleeve being connected to the drive shaft by a thin annular disc resistant to torsional forces. Moreover, means are provided for elastically supporting the sleeve in a radial direction.

---

Figure 1:
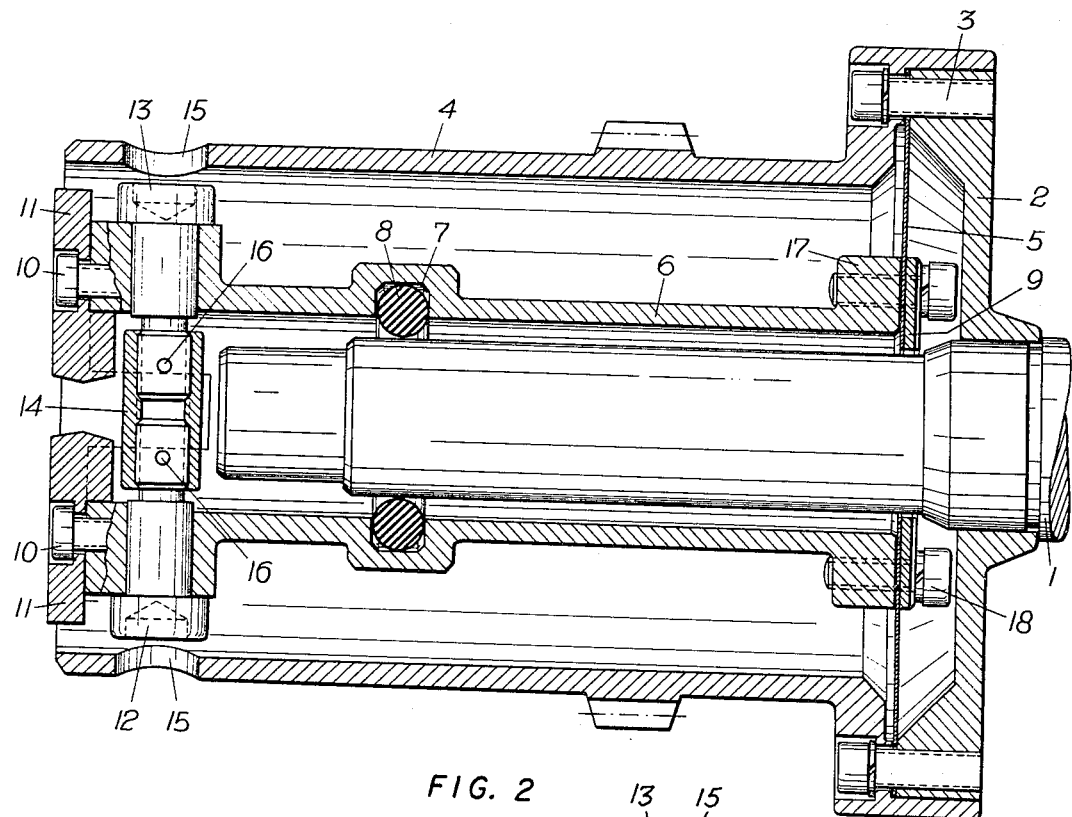

The present invention relates to clutch means for a test stand for fuel injection pumps. Such a test stand comprises a drive spindle housing provided with a drive shaft extending therefrom adopted to be coupled with engaging dogs with the pump to be tested by such clutch means.

A prior art embodiment of such a clutch means is coupled to the pump to be tested with the interposition of a driving plate, consisting of duroplastic material and being provided with two pairs of slots vertically arranged one relative to the other. When coupling is effected in the slots of one pair of slots engaging dogs connected to the drive shaft and in the slots of the other pair of slots engaging dogs of the pump to be tested are introduced. With such a clutch means, the engaging dogs vibrate relative to the slots in the driving plate on account of the tolerance in width of the engaging dogs and on account of the engaging dogs being relatively displaced thereby resulting in a rapid wear of the driving plate. Further, due to the play between the driving plate slots and the engaging dogs the torque can not be uniformly transmitted to the pump to be tested and for this reason, the characteristics of the pump to be tested can not be measured in a reliable manner. When the driving plate slots are given a smaller width this results in the disadvantage that a possible movement in the clutch means similar to the movement in a universal-joint gives rise to substantial transverse forces in the clutch means, thus resulting in excessive loading of the bearings of the driving shaft in the drive spindle housing.

In a further prior art clutch means comprising numerous movable parts, the engaging dogs of the pump to be tested are coupled to the driving shaft of the test stand after introducing into the clutch means by means of a box-spanner. Such a clutch means is disadvantageous in that the test stand can not be operated without a pump coupled thereto, because the jaws and screws are loosened and are rolling in the clutch means when varying the revolution speed. This condition is particularly objectionable when checking the tachometer of the test stand and no suitable pump is at hand.

It is an object of the present invention to avoid the drawbacks of prior art clutch means of the kind described and to provide a clutch means for coupling the drive shaft protruding from the drive spindle housing of a test stand for fuel pumps with the engaging dogs of the pump to be tested such that the torque is exactly transmitted from the drive shaft to the pump to be tested. The invention essentially consists in that the drive shaft is surrounded by a sleeve, which can be coupled with the engaging dogs of the pump to be tested and which is connected to the drive shaft, as known per se with a flexible coupling of two shafts, by means of a thin annular disc, for instance a steel plate disc, resistant to torsional forces, whereby the sleeve is elastically supported in the radial direction. In a clutch means according to the invention the pump to be tested is driven by the sleeve connected to the drive shaft with interposition of the steel plate disc, so that no play exists between different clutch parts and the pump to be tested is at any time driven by the required torque, which is constantly varying during each revolution. The steel plate disc per se can not be distorted. However, with the steel plate disc in combination with the sleeve being elastically supported, relative movement between the drive shaft and the pump to be tested, respectively, is possible without substantially loading the steel plate disc and, above all, without exerting transverse forces on the pump.

According to a preferred embodiment of the invention the steel plate disc or the like is arranged at one end of the sleeve, whereas the other end of the sleeve, which can be coupled with the engaging dog of the pump to be tested, is elastically supported relative to the drive shaft, preferably by a rubber ring arranged in a groove in the sleeve. With this arrangement the length of the sleeve can be kept small and the steel plate disc can easily be fixed to a flange provided at one end of the sleeve. Supporting the other end of the sleeve by a rubber ring is advantageous in that such a rubber ring represents an inexpensive construction element and that the rubber ring can easily be interchanged for another. The rubber ring practically is not subjected to wear on account of the fact that the drive shaft and the sleeve are rotated with equal speed. According to the invention the steel plate disc is conveniently connected to a fly-wheel mass connected to the driving shaft. This is efficacious in that no special construction element must be arranged between the drive shaft and steel plate disc and that a varying torque becomes only effective in the steel plate disc and in the sleeve and not on the drive shaft, because, as mentioned, the fly-wheel mass is connected to the drive shaft and the sleeve is of as little mass as possible.

According to the invention that end of the sleeve which can be coupled with the engaging dogs of the pump to be tested, can be slotted whereby at the front end of each sleeve half, provided by slotting the sleeve, an engaging claw is arranged. It is the distance of the inner faces of both engaging claws which defines the engaging slot into which the engaging dogs of the pump to be tested are to be introduced. With this embodiment of a clutch means according to the invention it is not necessary to rigidly connect the pump to be tested with the sleeve, i.e. to clamp the engaging dog of the pump to be tested, but it is sufficient that the play of the engaging dogs of the pump within the engaging slot defined by the inner faces of the engaging claws be small enough. To provide for an adjustability of the play and for a small variability of the distance of the inner faces of the engaging claws, both sleeve halves, can according to the invention, be clamped together by clamp means. This enables a later adjustment of the distance of the engaging claws. Such a later adjustment is by no means necessary with each new pump to be tested but it is sufficient to check the distance between the inner faces of the engaging claws in time intervals.

Figure 2:
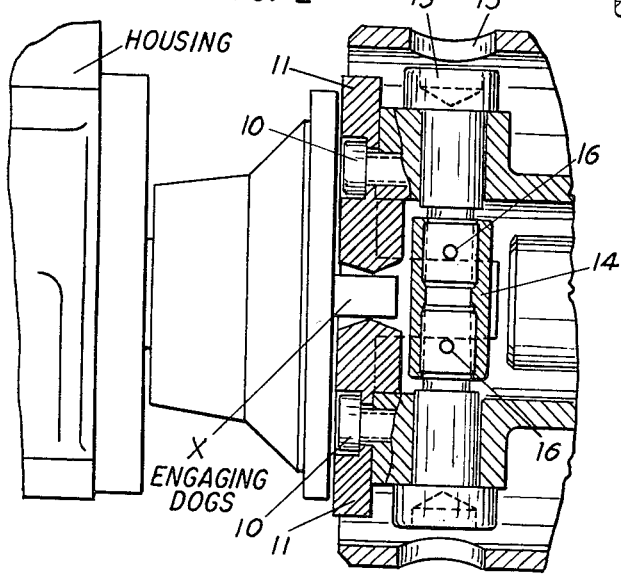

The invention is further illustrated with reference to FIG. 1 of the drawing, in which an embodiment of a coupling means according the invention is illustrated partly in elevation and partly in section. FIG. 2 is a side elevation, partly in section, showing the connection between the coupling means and the pump to be tested.

A drive shaft 1 protruding from a drive spindle housing of the test stand is coupled to a fly-wheel mass 2, which is connected by means of screws 3 to a covering sleeve 4 surrounding the protruding end of the drive shaft and to a steel plate disc respectively. A sleeve 6 is arranged within the covering sleeve 4 and one end thereof is formed with a flange 17. The flange 17 is connected to the steel plate disc 5 by means of screws 18 and adjacent the other end the sleeve 6 is provided with an inner circumferential groove 7. A rubber ring 8 is inserted into the circumferential groove 7, and the rubber ring 8 is supported against the drive shaft 1. By this arrangement, the sleeve 6 is elastically supported in a radial direction relative to the drive shaft. With this embodiment the driving torque is transmitted to the sleeve 6 via the fly-wheel mass 2, the screw 3, the steel plate disc 5 and the screws 18 so that the drive shaft is only subjected to an average torque and variations in torque become only effective in the steel plate disc 5 and the sleeve 6 connected thereto.

At those areas of the steel plate disc where the disc does not transmit any torque, i.e. adjacent the screws 18 and within these screws, the steel plate disc 5 is reinforced by washers 9.

The sleeve 6 must be coupled with the engaging dogs of the pump to be tested and for this purpose in the embodiment illustrated, the sleeve 6, at its end not connected to the steel plated disc 5, is formed of sleeve halves. To the front end of each of both sleeve halves a claw 11 is fixed by a screw 10, with the distance of the inner faces of the claws defining the engaging slot into which the engaging dogs of the pump to be tested are to be introduced. The claws are supported by the front ends of the sleeve halves such that the screws 10 need not exert any driving forces. Both sleeve halves can be clamped together by clamp means to enable adjustment to certain tolerances. This clamp means consists of two screws 12 and 13 inserted into radially aligned bores within the sleeve 6 and are connected with one another by a threaded sleeve 14 into the inner thread of which the screws 12 and 13 are threaded. The screws 12 and 13 are provided with an axial hexagon hole and can be turned by means of a hexagon screw key which can be inserted through an opening 15 provided in the covering sleeve 4. With this arrangement the distance of the inner faces of the claws 11 can be varied within the range of elastic deformation of both sleeve halves. The selected position of the screws 12 and 13 is, after correct adjustment of the distance of the inner faces of the claws 11, secured by set pins 16, which are introduced into a bore provided in the threaded sleeve 14 and a bore in the screws 12 and 13, respectively, aligned with the first bore. For this purpose, the screws 12 and 13, respectively, or the sleeve 14 are provided with a plurality of bores corresponding to certain distances of the inner faces of the claws 11. The claws for instance consist of nickel—bronze or plastic with the desired sliding properties so that within the engaging slot formed by the claws small relative movement of the respective parts is possible. If desired, the claws can be provided with a layer of molykote prior to introducing the engaging dogs of the pump to be tested. Such relative movements, however, are practically of no importance in view of the steel plate disc 5 and the sleeve 6 elastically supported by the rubber ring 8 do not admit transverse forces. This is of major importance since transverse forces must not be exerted on the pump to be tested. The claws 11 can be substituted by other claws, so that by substituting the claws it is possible to provide other slot widths.

What I claim is:

1. Coupling means for a test stand for fuel injection pumps for coupling a drive shaft protruding from a drive spindle housing of the test stand with engaging dogs of a pump to be tested, the improvement comprising a sleeve surrounding the drive shaft, a thin annular disc resistant to torsional forces connecting one end of said sleeve to said drive shaft, the other end of said sleeve being slotted to provide two sleeve halves, coupling claws carried by said sleeve halves cooperable with the engaging dogs of the pump to be tested, and means for elastically supporting said sleeve in a radial direction.

2. The coupling means as claimed in claim 1 in which a rubber ring disposed between said drive shaft and said sleeve and located in a peripheral groove at the inner face of said sleeve constitutes said elastically supporting means.

3. The coupling means as claimed in claim 1 in which at each front end of said sleeve halves a coupling claw is provided and means for clamping both sleeve halves together.

4. The coupling means as claimed in claim 1 in which said thin annular disc resistant to torsional forces is connected to a fly-wheel mass connected to the drive shaft.

5. Coupling means as claimed in claim 1 in which a rubber ring disposed between the drive shaft and the sleeve and inserted in the peripheral grooves at the inner face of the sleeve constitutes the elastically supporting means.

6. The coupling as claimed in claim 1 in which each front end of said sleeve halves is provided with a coupling claw and means for clamping both sleeve halves together.

References Cited

UNITED STATES PATENTS

| 1,170,450 | 2/1916 | Lachmann | 64—13 X |
| 2,107,689 | 2/1938 | Gugatti | 64—13 X |
| 2,126,342 | 8/1938 | Nippert | 73—118 |
| 2,470,351 | 5/1949 | Hartridge | 73—119 X |
| 2,832,906 | 4/1958 | Koons | 64—13 X |

HALL C. COE, *Primary Examiner.*